(12) United States Patent
Walsh

(10) Patent No.: US 8,278,787 B2
(45) Date of Patent: Oct. 2, 2012

(54) RADIAL SOLENOID ARRAY

(76) Inventor: Raymond James Walsh, Dallas, TX (US)

( * ) Notice: Subject to any disclaimer, the term of this patent is extended or adjusted under 35 U.S.C. 154(b) by 247 days.

(21) Appl. No.: 12/859,770

(22) Filed: Aug. 19, 2010

(65) Prior Publication Data

US 2011/0204733 A1 Aug. 25, 2011

Related U.S. Application Data

(60) Provisional application No. 61/235,015, filed on Aug. 19, 2009.

(51) Int. Cl.
*H02K 7/06* (2006.01)
*H02K 33/00* (2006.01)
*H02K 35/00* (2006.01)

(52) U.S. Cl. ............... 310/37; 310/34; 310/36; 310/38; 310/89; 200/178

(58) Field of Classification Search .............. 310/34, 310/36, 37, 38, 89; 200/178; *H02K 7/06, H02K 33/00, 35/00*
See application file for complete search history.

(56) References Cited

U.S. PATENT DOCUMENTS

| | | | | |
|---|---|---|---|---|
| 1,380,168 A * | 5/1921 | Whittingham | ............... | 361/161 |
| 1,724,446 A | 8/1929 | Worthington | | |
| 1,725,203 A * | 8/1929 | McNerney | ............... | 318/14 |
| 1,782,242 A * | 11/1930 | McNerney | ............... | 310/37 |
| 2,109,111 A | 2/1938 | Gearhart et al. | | |
| 2,161,256 A * | 6/1939 | Karcher | ............... | 73/650 |
| 2,671,863 A * | 3/1954 | Matthews | ............... | 310/36 |
| 3,115,563 A | 12/1963 | Tomaro, Jr. | | |
| 3,139,546 A | 6/1964 | Parr | | |
| RE25,934 E * | 12/1965 | Chausson | ............... | 417/418 |
| 3,356,919 A * | 12/1967 | Reich | ............... | 318/128 |
| 3,361,948 A | 1/1968 | Sawyer | | |
| 3,501,655 A * | 3/1970 | Siefert | ............... | 310/38 |
| 3,688,136 A * | 8/1972 | Salverda | ............... | 310/24 |
| 3,703,653 A * | 11/1972 | Tracy et al. | ............... | 310/24 |
| 3,714,518 A | 1/1973 | Mohler | | |
| 3,739,309 A | 6/1973 | Dalton | | |
| 4,429,952 A | 2/1984 | Dominguez | | |
| 4,524,293 A | 6/1985 | Komatsu | | |
| 4,620,771 A | 11/1986 | Dominguez | | |
| 4,885,487 A | 12/1989 | Ksovreil et al. | | |
| 4,930,493 A | 6/1990 | Sallis | | |
| 4,998,031 A * | 3/1991 | Griffey | ............... | 310/37 |

(Continued)

FOREIGN PATENT DOCUMENTS

WO 02/095912 A1 11/2002

*Primary Examiner* — John K Kim
(74) *Attorney, Agent, or Firm* — Jack D. Stone, Jr., Esq.; Scheef & Stone, L.L.P.

(57) ABSTRACT

A motor includes a base plate and an armature having two or more arms mounted to the base plate for rotation about an axis. At least two powerstroke solenoids are positioned on each arm for applying force effecting first rotational motion of the armature. At least one reset solenoid is positioned on each arm for applying force effecting second rotational motion of the armature opposite the first rotational motion. Means are provided for sequentially applying current to the powerstroke solenoids and then to the reset solenoids to effect an oscillating motion of the armature. Further means are provided for transferring the first rotational motion to a disk cylinder rotatably mounted to the base plate for rotation about the axis, but for restraining the transfer of the second rotational motion to the disk cylinder.

9 Claims, 2 Drawing Sheets

U.S. PATENT DOCUMENTS

| | | |
|---|---|---|
| 6,015,958 A | 1/2000 | Pomatto et al. |
| 7,218,025 B1 | 5/2007 | McDonald |
| 7,464,703 B2 | 12/2008 | Aaron |
| 7,513,250 B2 | 4/2009 | Head et al. |
| 2005/0161073 A1 | 7/2005 | Head et al. |
| 2006/0279389 A1* | 12/2006 | Baumbach et al. ........... 335/272 |
| 2009/0165841 A1 | 7/2009 | Gunn, Jr. et al. |
| 2011/0204733 A1* | 8/2011 | Walsh ............................ 310/37 |

* cited by examiner

| SOLENOID | | INITIAL PLUNGER POSITION 134 |
|---|---|---|
| A | 2X | 1MM |
| B | 2X | 2MM |
| C | 2X | 3MM |
| D | 2X | 4MM |
| E | 1X (2 SOLENOIDS) | 3MM |
| F | 1X (2 SOLENOIDS) | 4MM |

RADIAL SOLENOID ARRAY

CROSS-REFERENCE TO RELATED APPLICATIONS

This application claims the benefit of U.S. Provisional Application No. 61/235,015, filed Aug. 19, 2009, which application is hereby incorporated herein by reference, in its entirety.

TECHNICAL FIELD

The invention relates generally to motors and, more particularly, to a low-RPM motor designed for high reliability over an extended period of time.

BACKGROUND

The linear solenoid is an obvious choice for the conversion of electrical to kinetic energy in an austere environment because of its simplicity, comprising primarily a wire wound in a coil. When current is applied, it creates an electromagnetic force on a ferromagnetic shaft or plunger in the center of the coil without the necessity of direct contact: it is action at a distance and thus movement can happen with minimal friction. Additionally, the electrical components are easily isolated from the corrosive effects of the environment.

The downside of the solenoid, the attribute that limits its utility, has to do with the mathematics of a magnetic induction field, in which the force falls off exponentially with the distance. So while the force generated by a 24 V solenoid on its shaft may be relatively high over the first millimeter of displacement, say 10 Newtons, by 2 mm it may fall to 5 N, by 3 mm to 2.5 N, and by 4 mm to 1.25 N, etc.

Accordingly, a continuing search has been directed to the development of a device that provides the simplicity and reliability of solenoids without the exponential decay of force conventionally associated with solenoids.

SUMMARY

The present invention, accordingly, provides a radial solenoid array (RSA) which may be adapted for use with an inexpensive and reliable solar tracking device which requires little maintenance, has a life-span of at least twenty years, and which can withstand strong winds. Accordingly, the RSA of the present invention includes a base plate and an armature rotatably mounted to the base plate for rotation about an axis, the armature having two or more arms extending outwardly from the axis. At least two powerstroke solenoids are positioned on each of the at least two arms, the least two powerstroke solenoids being radially spaced from each other, the at least two powerstroke solenoids further being configured for applying force in a first direction onto the respective at least two arms for effecting a first rotational motion of the armature. At least one reset solenoid is positioned on each of the at least two arms for applying force in a second direction onto the at least two arms for effecting a second rotational motion of the armature, the first direction being opposite the second direction, and the first rotational motion being opposite the second rotational motion. Means are provided for sequentially applying current to the at least two powerstroke solenoids and then to the at least one reset solenoid, to sequentially effect the first rotational motion of the armature followed by the second rotational motion of the armature. Further means are provided for transferring the first rotational motion to a disk cylinder rotatably mounted to the base plate for rotation about the axis, but for restraining the transfer of the second rotational motion to the disk cylinder.

The RSA is a low-rpm pulsetile electrical motor with the reliability of a linear solenoid. The central mechanism has no full-rotational motion, unlike conventional electric or fossil-fuel motors, but oscillates back and forth about a theoretical axis. Since the axis of rotation is theoretical, and there is no full rotation, frictional forces are minimal and the motor requires no lubrication. The RSA will function under essentially the same climactic conditions as a typical solenoid, and the sealed coils and contacts make it impervious to the corrosive effects of oxygen and water. Electrical contacts and switching occur within the safe harbor of a sealed, inert gas-filled Form C reed switch encased in epoxy and activated at a distance with a magnetic sensor. The electrical components have no exposure to the atmosphere. The RSA is ideal for applications where low maintenance and reliability are a must.

The RSA is a highly durable motor that is designed to "set and forget". It was designed with simple, inexpensive components requiring little or no maintenance, and to be highly resistant to water and temperature extremes, and harsh climactic conditions such as heat, dust, wind, and rain. It is a highly reliable low RPM motor that is ideal for applications in austere environments such as celestial tracking of heavenly bodies through space, tracking the sun across the sky, or directing telecommunications devices towards a source or receiver. The RSA incorporates a Magnetic Pinch Clutch (MPC) assembly for power transfer as described below.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
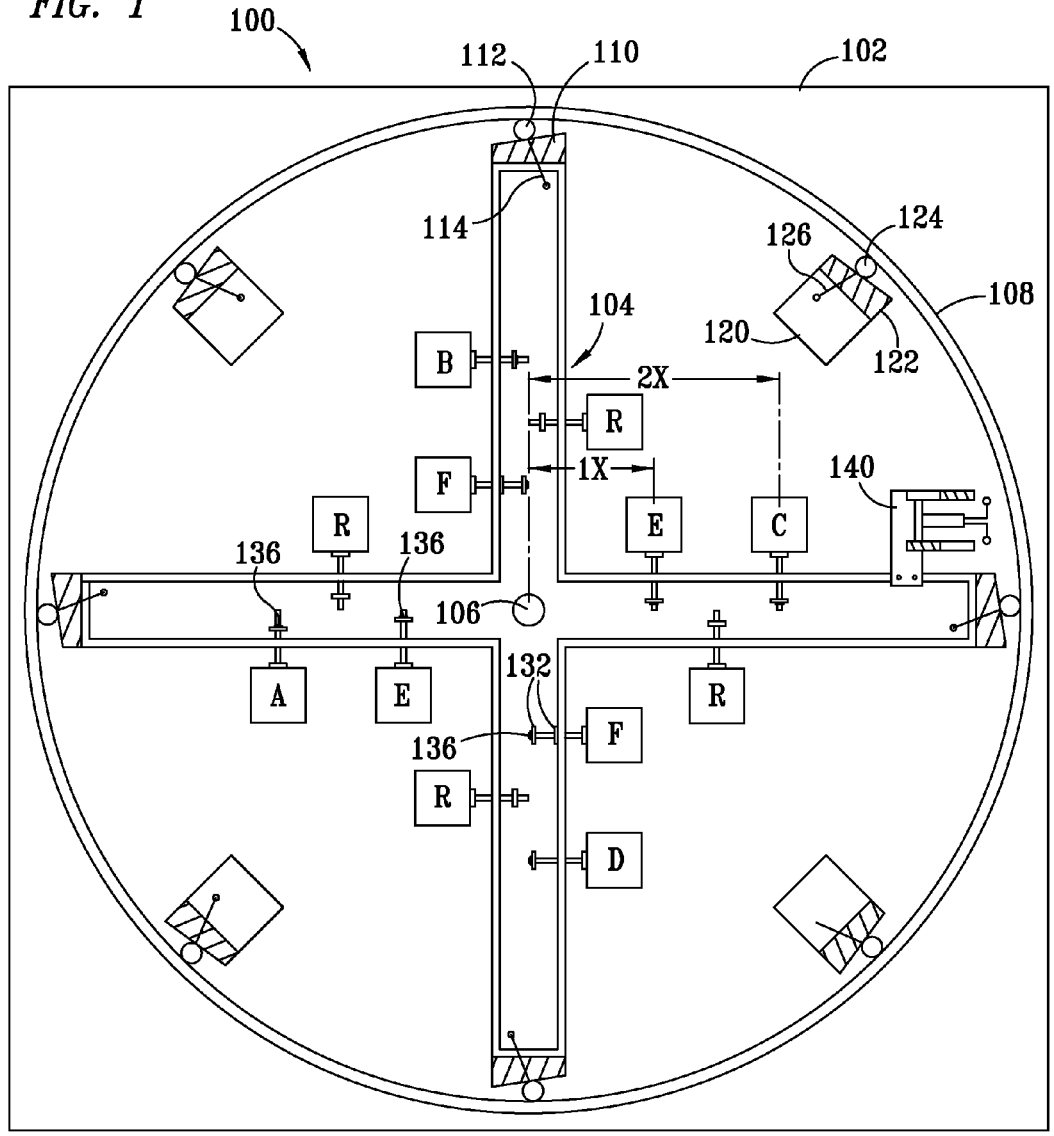
FIG. 1 exemplifies a plan view of a motor embodying features of the present invention.

In the discussion of the FIGURES, the same reference numerals will be used throughout to refer to the same or similar components. Further, numerous specific details are set forth to provide a thorough understanding of the present invention. However, it will be obvious to those skilled in the art that the present invention may be practiced without such specific details. In other instances, well-known elements have been illustrated in schematic or block diagram form in order not to obscure the present invention in unnecessary detail.

Additionally, for the most part, details concerning solar panels and the like have been omitted inasmuch as such details are not considered necessary to obtain a complete understanding of the present invention, and are considered to be within the skills of persons of ordinary skill in the relevant art.

Although there are a number of ways to configure an array of push or pull type solenoids of varying specifications about an armature with multiple arms, the present invention will be exemplified conceptually using an array of twelve solenoids. As exemplified by FIG. 1, the twelve solenoid RSA motor 100 is preferably an array of twelve similar solenoids arranged around a "plus sign" shaped armature 104 rotating about a central post 106 to which it is attached with wires. The solenoids are configured to pull individually or in pairs to produce a cumulative displacement with a relatively constant force.

In operation, the twelve pull-type solenoids are divided symmetrically between each of the four arms of the armature 104 to yield three solenoids per arm. The solenoid bodies are attached to a base plate 102 with the solenoid shafts attached symmetrically around the armature thus effectively suspending the armature between the solenoids. The solenoids pull at right angles to each attached arm. The array preferably comprises eight powerstroke solenoids A, B, C, D, E, and F and four reset solenoids R, four powerstroke solenoids E and F placed at a position 1× from the armature axis plus four powerstroke solenoids A, B, C, and D placed at a position 2× from the axis, and then four reset solenoids R placed on the opposite side of each arm at the 1.5× position. In FIG. 1, powerstroke movement is counterclockwise while reset is clockwise. The powerstroke solenoids are connected in parallel on the same electrical circuit and work in concert to produce the counterclockwise powerstroke displacement. Similarly, the four reset solenoids are wired in parallel on a separate circuit to produce the clockwise reset. The total displacement for the device can be adjusted shorter for applications requiring greater torque and longer for applications requiring less torque per powerstroke. This is done by tuning or adjusting the initial plunger depth of each component solenoid to a shorter individual displacement for higher torque.

Switching between the powerstroke and reset circuits is accomplished by a Form C latching reed switch mounted to the base plate below one of the arms. This arm has two sensor magnets, a powerstroke magnet and a reset magnet, which actuate the switching between powerstroke and reset circuits: one positioned to switch at the point of powerstroke maximum displacement (the counterclockwise limit of motion) and the other at reset maximum displacement (the clockwise limit of motion).

Explained another way, when power is applied to the circuit, current will flow through the eight powerstroke solenoids causing the armature frame to rotate counterclockwise. The Reset magnet (see FIG. 1) on the armature frame is positioned so that when the maximum powerstroke displacement has been achieved, the Reed Switch 140 will redirect current from the powerstroke circuit to the reset circuit. This will activate the Reset Solenoids R to pull in the opposite direction, and the armature begins to rotate clockwise. The second sensor magnet, a Powerstroke magnet, is positioned on the same arm so that when maximum reset displacement has been achieved, the reed switch returns current to the powerstroke circuit, and the cycle begins anew. The RSA motor will continue to oscillate between powerstroke and reset as long as there is electrical power to it.

The solenoid placement at distances 1× and 2× were chosen because each arm functions as a Class 3 lever with the fulcrum at the center of the armature, the force supplied by solenoids, and the load occurring at the end of each arm. (The RSA can also be configured as a Class 1 or Class 2 lever.) If, for example, a solenoid at the 2× position generates a force of 10 Newtons at the end of the arm, the same solenoid will only generate a force of 5 N at the end of the arm when placed at the 1× position. In order to achieve a force of 10 N, then, two solenoids will be required at the 1× position (2 times 5 N). Note that a displacement of 1 mm at the 1× position results in a displacement of 2 mm at the 2× position.

Figures 2, 3:
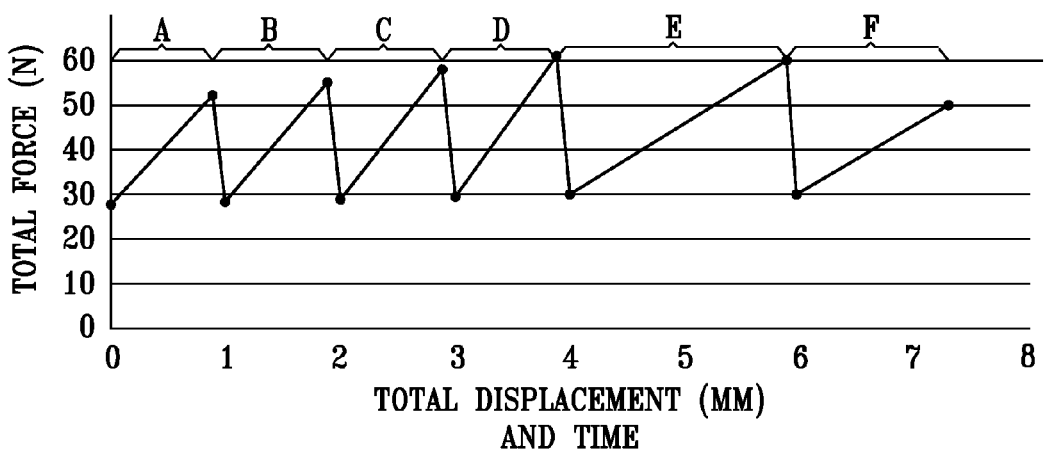
FIG. 2 exemplifies the angular displacement of an armature of the motor of FIG. 1.
FIG. 3 exemplifies initial plunger offsets in the motor of FIG. 1.

Proper timing is achieved by adjusting the initial displacement of individual solenoid plungers with respect to the armature as per FIG. 3. Before continuing it is important to clarify what is meant by "timing". When power is applied to the powerstroke circuit all 8 powerstroke solenoids will be activated at once but with varying degrees of force depending on the initial plunger position. Timing is intended to mean the point at which the plunger gets close enough to its' endpoint to pull with sufficient force to perform meaningful work (for this purpose 1 mm). Other solenoids in the array at some point beyond 1 mm are still exerting a force on the armature, albeit a lesser force. Recall that owing to the exponential nature of electromagnetic fields, the closer the plunger is to its endpoint, the greater the force. Conversely, the farther the plunger from its' endpoint, the lesser the force. The distance of 1 mm is a somewhat arbitrary choice selected to illuminate the function of the simultaneous current RSA.

FIG. 2 represents the summation of the pull forces of each active solenoid at any given point throughout powerstroke. As each individual solenoid (or solenoid pair) nears its plunger endpoint, there is an associated spike in the force graph which is labeled A, B, C, D, E, or F depending on the solenoid or solenoid pair responsible for the spike.

FIG. 2 illustrates two design challenges in producing a constant minimum force: Observe that throughout much of the powerstroke the device pulls with a minimum of 30 N. The two exceptions are right at the beginning, where the pull force is about 25 N, the second is at displacement position 6 mm where the pull force is at 20 N.

The initial pull force of 25 N can easily be brought up to 30 N by adjusting the positioning of the powerstroke sensor magnet that switches current from the reset back to the powerstroke via the Form C reed switch 140. In other words, instead of resetting completely back to 8 mm, the reset solenoids bring the armature back to say 7.5 mm. The result is that the first of the series of 2× solenoids will begin to pull at a plunger displacement of 0.5 mm. instead of 1.0 mm, thus producing a greater individual force and resulting in a net pull force greater than 30 N. This comes at the cost of 0.5 mm, of course, bringing the net total displacement down to 7.5 mm.

The second challenge, the dip in net pull force to 20 N at the 6 mm displacement point, can be ameliorated by incorporating a device I will call the Magnetic Force Coupler (MFC). The MFC (FIG. 2) is an arrangement of 2 opposing circular magnets located on the 1× solenoids, one attached to the arm of the appropriate armature and the other to the plunger pin, to compensate for the drop in RSA force near the end of the powerstroke. A pair of opposing circular magnets with a hole in the middle surround the displacement pin so that when the plunger displacement is far, say 5 mm, and the corresponding force low (on the order of 5 N) the force coupler maintains maximal pin displacement relative to the plus arm. As the RSA nears the end of the total displacement, and the 1× solenoid plungers approach 1 mm, the solenoid force increases. Because the solenoid plunger pin head 136 is not pulling directly against the arm, it is pulling against opposing magnets, there is movement of the plunger deeper into the solenoid WITHOUT displacement of the armature. This movement deeper into the solenoid generates a greater pulling force. When the pull force of the solenoid exceeds the repulsive force of the opposing magnets, the armature will begin to move. The MFC, then, enables the pull force at the 6 mm displacement point to be tuned to 30 N. The cost is about 1 mm of total displacement, which drops from 7.5 mm to 6.5 mm. A damper is incorporated to dampen the return of the plunger pin to neutral position when the solenoid releases.

Power from the RSA motor 100 can be transferred using a variety of mechanisms including a simple ratchet. However, described herein is a novel power transfer mechanism referred to as a magnetic pinch clutch as a means of providing efficient transfer of power. It is composed of two equal but opposing elements designed to selectively increase friction between the RSA motor and the RSA disc cylinder. The first is the powerstroke element and is attached at the ends of the four arms of the armature 104. It consists of a small, rolling hollow ferromagnetic cylinder 112 wedged between the RSA disc cylinder 108 and a magnetized ferromagnetic wedge 110 attached to the armature, and secured thereto via clip 114. During powerstroke of the embodiment as illustrated, the arm rotates counterclockwise effectively wedging or pinching the magnet between the RSA armature and the RSA disc cylinder. This wedging action occurs simultaneously and symmetrically at the ends of each of the four arms of the armature. In this way, the armature effectively grips and transfers mechanical power the RSA disc. (In an alternative arrangement, a small ferromagnetic cylinder would be used instead of a magnet, and a magnet would be attached to the wedge at the end of the arm.) During reset, the arm moves clockwise releasing the pinched magnet. In order to prevent the RSA disc from also moving clockwise, an analogous set of reset elements 122, 124, and clip 126 are attached to the base plate 102 between each of the powerstroke elements but are otherwise similar in form and function to the powerstroke element. The net effect of the reset elements is to hold the RSA disc in position while the RSA motor is resetting for the next powerstroke.

The juxtaposition of the powerstroke and reset elements insures the efficient transfer of mechanical power regardless of the length of the displacement effected by the powerstroke. This allows for full function in a variety of applications from those requiring high torque with short displacement to those requiring greater displacement at a lower torque.

The real value of the RSA/pinch clutch may lie in applications where torque is more important than displacement, and where there may be some variability in torque required by the machine. One such application would be an array of push-type solenoids configured as above except all engaging simultaneously (equal initial plunger depths). As an example, if such an array were to generate a cumulative force of say 40 N then this particular RSA could perform work require forces up to this 40 N limit (say 39 N or 20 N or 3 N). Work requiring greater force would produce a series of shorter powerstroke/reset cycles, whereas lighter workloads would allow for longer powerstroke/resent cycles. To illustrate the point, if the RSA were required to generate a force of 20 N, the powerstroke cycle would begin proceed up to the point that the RSA force output was equal to 20 N before activating the reset solenoid. Thus, the magnetic pinch clutch with its pairing of power stroke and reset clutches eliminates the need for cumbersome gearing. Furthermore, the magnetic pinch clutch would perform the same function even with just one solenoid.

It is understood that the present invention may take many forms and embodiments. Accordingly, several variations may be made in the foregoing without departing from the spirit or the scope of the invention. For example, the fulcrum, load, and levers (arms) of the RSA may be configured as either a class 1 or 2 lever instead of class 3 as drawn. The solenoids may be mounted on the armature and configured having them pull and/or push against attachments to the base plate. Instead of a magnetized cylinder in the pinch clutch, a magnetized steel ball may be used in a groove or the cylinder may be held in place by a spring rather than by magnets. A contact switch, magnetic switch, or any other type of switch may be used in place of a reed switch. The electromagnets instead of solenoids may be positioned in an array. Instead of a single armature, there could be multiple independent armatures configured radially like the spokes of a wheel. Instead of power transfer happening via a clutch or ratchet at the ends of the arms, a shaft could run through the middle of the armature axis from which power is transferred.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered obvious and desirable by those skilled in the art based upon a review of the foregoing description of preferred embodiments. Accordingly, it is appropriate that the appended claims be construed broadly and in a manner consistent with the scope of the invention.

The invention claimed is:

1. A radial solenoid array for generating a rotational motion, the array comprising:
    a base plate;
    an armature rotatably mounted to said base plate for rotation about an axis, said armature having two or more arms extending outwardly from said axis;
    at least two powerstroke solenoids positioned on each of said at least two arms, said at least two powerstroke solenoids being radially spaced from each other, said at least two powerstroke solenoids further being configured for applying force in a first direction onto said respective at least two arms for effecting a first rotational motion of said armature;
    at least one reset solenoid positioned on each of said at least two arms for applying force in a second direction onto said at least two arms for effecting a second rotational motion of said armature, said first direction being opposite said second direction, and said first rotational motion being opposite said second rotational motion; and
    means for sequentially applying current to said at least two powerstroke solenoids and then to said at least one reset solenoid, to sequentially effect said first rotational motion of said armature followed by said second rotational motion of said armature.

2. The array of claim 1, wherein said means is a reed switch positioned to switch on current to said at least two powerstroke solenoids and switch off current to said at least one reset solenoid when said armature has moved to a first predetermined position, and to switch off current to said at least two powerstroke solenoids and switch on current to said at least one reset solenoid when said armature has moved to a second predetermined position.

3. The array of claim 1, further comprising:
a disk cylinder rotatably mounted to said base plate for rotation about said axis;
means for imparting rotational motion of said armature to said disk cylinder when said armature is moving with said first rotation motion; and
means for restraining said disk cylinder from rotational motion when said armature is moving with said second rotation motion.

4. The array of claim 1, further comprising:
a disk cylinder rotatably mounted to said base plate for rotation about said axis;
a powerstroke pinch clutch positioned between said two or more arms and said disk cylinder for engaging said disk cylinder with said two or more arms and moving said disk cylinder with said two or more arms when said two or more arms are moving with said first rotational motion; and
a reset pinch clutch positioned a between said base plate and said disk cylinder for engaging said disk cylinder and retraining movement of said disk cylinder when said two or more arms are moving said second rotational motion.

5. The array of claim 1, further comprising:
a disk cylinder rotatably mounted to said base plate for rotation about said axis;
a powerstroke pinch clutch mounted to each of said two or more arms proximate to said disk cylinder, said powerstroke pinch clutch defining with said disk cylinder a wedge-shaped slot for receiving a cylinder, which powerstroke pinch clutch transfers said first rotation motion from said two or more arms to said disk cylinder when said two or more arms are moving with said first rotational motion; and
a reset pinch clutch mounted to said base plate proximate to said disk cylinder, said reset pinch clutch defining with said disk cylinder a wedge-shaped slot for receiving a cylinder which moves to engage said disk cylinder and restrain movement of said disk cylinder when said two or more arms are moving said second rotational motion.

6. The array of claim 1, further comprising:
a disk cylinder rotatably mounted to said base plate for rotation about said axis;
a powerstroke pinch clutch mounted to each of said two or more arms proximate to said disk cylinder, said powerstroke pinch clutch including a powerstroke magnet shaped to define with said disk cylinder a wedge-shaped slot for receiving a cylinder magnetized to be magnetically attracted to said powerstroke magnet so that said powerstroke pinch clutch engages said disk cylinder with said two or more arms and transfers first rotational motion of said two or more arms to move said disk cylinder when said two or more arms are moving with said first rotational motion; and
at least one reset pinch clutch mounted to said base plate proximate to said disk cylinder, said reset pinch clutch including a reset magnet shaped to define with said disk cylinder a wedge-shaped slot for receiving a cylinder magnetized to be magnetically attracted to said reset magnet so that said reset pinch clutch restrains movement of said disk cylinder when said two or more arms are moving with said first rotational motion.

7. The array of claim 1, further comprising:
a disk cylinder rotatably mounted to said base plate for rotation about said axis;
a ratchet positioned between said two or more arms and said disk cylinder for imparting said first rotational motion of said armature to said disk cylinder, but restraining movement of said disk cylinder when said armature is moving with said second rotational motion.

8. The array of claim 1, further comprising:
a microcontroller for controlling current to each of said at least two powerstroke solenoids and to said at least one reset solenoid based on the need for torque and said first rotational motion and said second rotational motion.

9. The array of claim 1, further comprising:
a magnetic force coupler positioned on at least two of said at least two powerstroke solenoids.

\* \* \* \* \*